US012754172B2

(12) United States Patent
Kuratani et al.

(10) Patent No.: US 12,754,172 B2
(45) Date of Patent: Oct. 6, 2026

(54) GAS CHROMATOGRAPH

(71) Applicant: SHIMADZU CORPORATION, Kyoto (JP)

(72) Inventors: Yutaka Kuratani, Kyoto (JP); Shingo Masuda, Kyoto (JP); Masaru Kozakura, Kyoto (JP); Masahiro Kojima, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 263 days.

(21) Appl. No.: 18/191,415

(22) Filed: Mar. 28, 2023

(65) Prior Publication Data

US 2023/0384270 A1 Nov. 30, 2023

(30) Foreign Application Priority Data

May 25, 2022 (JP) ................................ 2022-085591

(51) Int. Cl.
*G01N 30/30* (2006.01)
*G01N 30/02* (2006.01)

(52) U.S. Cl.
CPC ....... *G01N 30/30* (2013.01); *G01N 2030/025* (2013.01); *G01N 2030/3084* (2013.01)

(58) Field of Classification Search
None
See application file for complete search history.

(56) References Cited

U.S. PATENT DOCUMENTS 5,589,630 A * 12/1996 Wiegand ................ G01N 30/30 73/23.35
2004/0232137 A1 11/2004 Cook et al.
2004/0245236 A1 12/2004 Cook et al.
2009/0119981 A1* 5/2009 Drozd ....................... F23K 1/00 44/544

FOREIGN PATENT DOCUMENTS

CN 1963498 A 5/2007
DE 19623319 A1 * 5/1997 ............ G01N 30/30
JP 2017-211225 A 11/2017
JP 2019050080 * 3/2019

OTHER PUBLICATIONS

Communication dated Mar. 3, 2026 in Japanese Application No. 2022-085591.

* cited by examiner

*Primary Examiner* — John E Breene
*Assistant Examiner* — Alex T Devito
(74) *Attorney, Agent, or Firm* — Sughrue Mion, PLLC

(57) ABSTRACT

A gas chromatograph includes an oven that has a first heater device and a second heater device. The first heater device and the second heater device are connected in series when a voltage of a power supply is a first voltage, and are connected in parallel when the voltage of the power supply is a second voltage that is lower than the first voltage. A power controller includes a first control device that controls ON/OFF of supply of power to the series-connected first heater device and second heater device or ON/OFF of supply of power to the parallel-connected first heater device, and a second control device that controls ON/OFF of supply of power to the parallel-connected second heater device. A controller adjusts a duty ratio of supply of power to the parallel-connected first heater device and second heater device by controlling the first control device and the second control device when the voltage of the power supply is the second voltage.

10 Claims, 9 Drawing Sheets

FIRST CONNECTION MODE (POWER SUPPLY AT 200 V:
HEATER DEVICES CONNECTED IN SERIES)

SECOND CONNECTION MODE (POWER SUPPLY AT 100 V:
HEATER DEVICES CONNECTED IN PARALLEL)

F I G. 7

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| INTEGRATION | 60 | 70 | 80 | 90 | 100 | 60 | 70 | 80 | 90 | 100 | 60 | 70 | 50 | 30 | 60 | 40 | 70 | 50 | 30 | 60 | 40 | 70 | 50 | 30 |
| OUTPUT | UPPER | LOWER | UPPER | LOWER | BOTH | UPPER | LOWER | UPPER | LOWER | BOTH | UPPER | LOWER | UPPER | NONE | LOWER | NONE | UPPER | LOWER | NONE | UPPER | NONE | LOWER | UPPER | NONE |
| SURPLUS | 10 | 20 | 30 | 40 | 0 | 10 | 20 | 30 | 40 | 0 | 10 | 20 | 0 | 30 | 10 | 40 | 20 | 0 | 30 | 10 | 40 | 20 | 0 | 30 |

T31
(60%)

T32
(30%)

FIRST CONNECTION MODE (POWER SUPPLY AT 200 V: HEATER DEVICES CONNECTED IN SERIES)

SECOND CONNECTION MODE (POWER SUPPLY AT 100 V:
HEATER DEVICES CONNECTED IN PARALLEL)

GAS CHROMATOGRAPH

BACKGROUND

Technical Field

The present invention relates to a gas chromatograph that includes an oven housing a column.

Description of Related Art

Generally, a gas chromatograph includes a sample vaporization chamber, a column and a detector. In the sample vaporization chamber, a liquid sample is heated to be vaporized. In the column, gas that has been vaporized in the sample vaporization chamber is separated into respective compounds. In the detector, the concentration of each of the compounds separated in the column is detected as an electric signal. The column is housed in an oven including a heater device, and the temperature of the column is maintained suitable for an analysis condition during an analysis. JP 2017-211225 A discloses a gas chromatograph including an oven, a heater and a controller that controls the oven and the heater.

Gas chromatographs are used in many countries and regions. The voltage of the power supply is 100 V or 200 V in Japan, is 115 V or 230 V in the United States and is 220 V to 240 V, etc. in Europe. Since power is supplied at different voltages depending on a region where a gas chromatograph is connected, a heater device compatible with the voltage of the power supply is required for configuration of an oven having specific energy output.

In order to deal with such a difference in voltage of the power supply, a gas chromatograph including a column oven capable of outputting common energy for different voltages of the power supply has been suggested. This column oven includes two heater devices having the same resistance value, and these two heater devices are configured to be connected in series or in parallel. For example, when being connected to the power supply the voltage of which is 200 V, the heater devices are connected in series. Further, when being connected to the power supply the voltage of which is 100 V, the heater devices are connected in parallel. With such a configuration, this column oven can output the same energy even in a case in which power is supplied from the power supply the voltage of which is either one of 100 V and 200 V.

SUMMARY

As described above, when the two heater devices are configured to be connectable in series or in parallel, even in a case in which the voltage of the power supply is either 100 V or 200 V, the user can utilize a gas chromatograph including an oven that has the common energy output. However, when the gas chromatograph having such a configuration is connected to the power supply the voltage of which is 100 V, a current that is twice as high as the current of when the voltage of the power supply is 200 V flows.

When a current value increases, since a high current flows through electric equipment such as a cable in an apparatus, the special specification is required for the equipment. Therefore, in a case in which the above-mentioned column oven having the common energy output is configured, it is not possible to make the resistance values of the heater devices very small in order to prevent a high current from flowing in the use environment of 100 V. As a result, although common energy can be output, it is difficult that the column oven is configured to be capable of outputting high energy also in a use environment of 200 V.

An object of the present invention is to provide a gas chromatograph including an oven that is capable of outputting high energy while being usable at different voltages of a power supply.

A gas chromatograph according to one aspect of the present invention includes an oven that has a first heater device and a second heater device and houses a column, a power controller that controls power to be supplied from a power supply to the oven, and a controller that controls an operation of the gas chromatograph, wherein the first heater device and the second heater device are connected in series when a voltage of the power supply is a first voltage, or are connected in parallel when the voltage of the power supply is a second voltage that is lower than the first voltage, the power controller includes a first control device that controls ON/OFF of supply of power to the series-connected first heater device and second heater device or controls ON/OFF of supply of power to the parallel-connected first heater device, and a second control device that controls ON/OFF of supply of power to the parallel-connected second heater device, and the controller adjusts a duty ratio of supply of power to the parallel-connected first heater device and second heater device by controlling the first control device and the second control device when the voltage of the power supply is the second voltage.

Other features, elements, characteristics, and advantages of the present disclosure will become more apparent from the following description of preferred embodiments of the present disclosure with reference to the attached drawings.

BRIEF DESCRIPTION OF THE DRAWING

FIG. 7 is a diagram showing a control method that is performed in order to achieve the target output of an oven in the second connection mode;

DETAILED DESCRIPTION

A gas chromatograph 1 according to embodiments of the present invention will now be described with reference to the attached drawings.

(1) Overall Configuration of Gas Chromatograph 1

Figure 1:
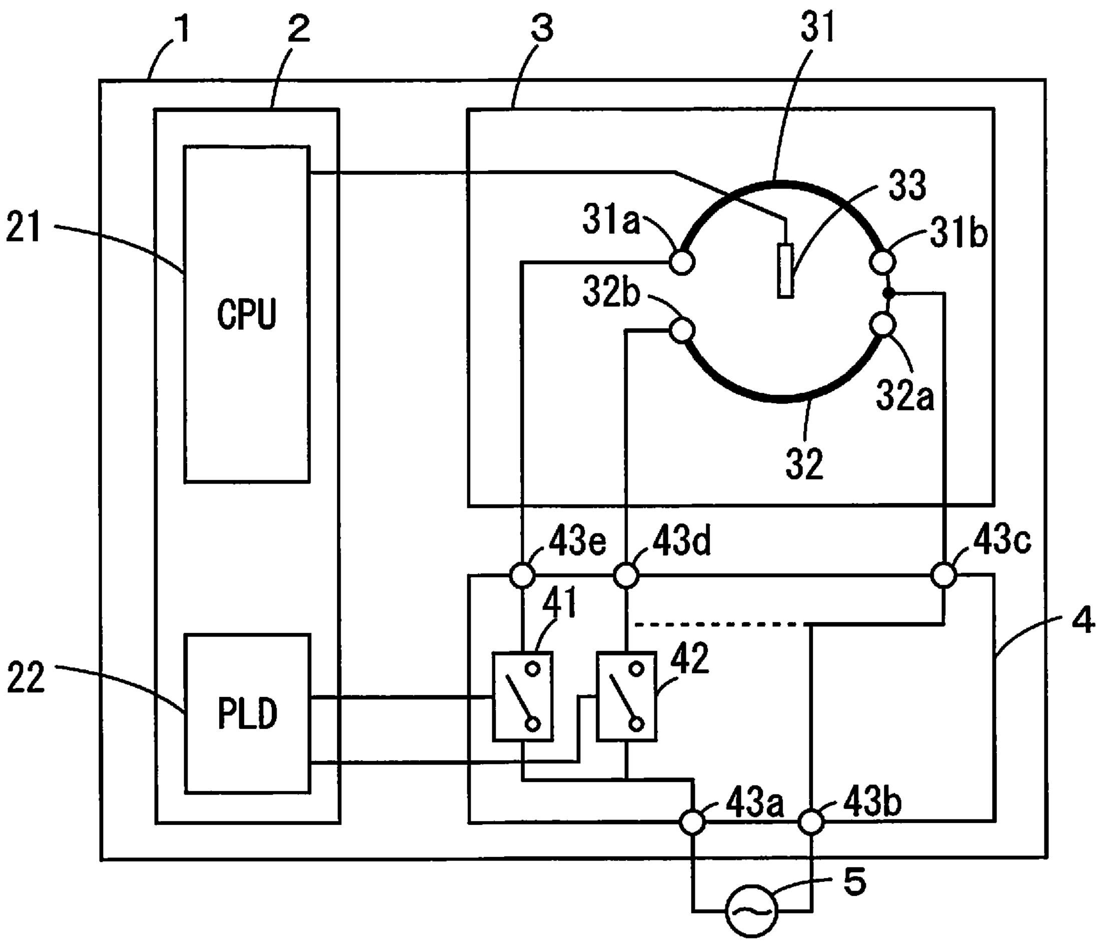
FIG. 1 is a diagram showing a gas chromatograph according to the present embodiment.

FIG. 1 is an overview of the gas chromatograph 1 according to the present embodiment. The gas chromatograph 1 includes a controller 2, an oven 3 and a power controller 4. FIG. 1 does not show the configurations of other components such as a sample vaporization chamber, a column for separating a sample, and a detector for detecting the concentration of each of compounds into which a sample is separated in the column as an electric signal.

The controller 2 includes a CPU (Central Processing Unit) 21 and a PLD (Programmable Logic Device) 22. The CPU 21 controls the entire gas chromatograph 1 including an analysis process to be executed by the gas chromatograph 1. The PLD 22 is a hardware logic device and restricts the power control performed by the power controller 4 by performing the hardware control.

The oven 3 includes a first heater device 31 and a second heater device 32 which are resistance heating elements. Each of the first heater device 31 and the second heater device 32 has a substantially semicircular shape as shown in the diagram, and the heater devices 31, 32, as a whole, make a substantially circular shape. Here, a resistance value of the first heater device 31 and a resistance value of the second heater device 32 are equal to each other, by way of example. The oven 3 also includes a column (not shown). The oven 3 raises the temperature in the oven 3 with Joule heat of the first heater device 31 and the second heater device 32, and maintains the temperature in the oven 3 at a constant temperature of about several tens of degrees to 450 degrees, for example. Thus, the column is heated to a temperature suitable for an analysis process. The oven 3 also includes a temperature sensor 33. The CPU 21 is notified of temperature information detected by the temperature sensor 33. The CPU 21 manages the temperature of the oven 3 based on the temperature information of the oven 3 acquired from the temperature sensor 33.

The power controller 4 controls the supply of power to the oven 3 by the power supply 5, which is a commercial power supply. The power controller 4 includes a first control device 41, a second control device 42 and terminals 43*a* to 43*e*. Each of the first control device 41 and the second control device 42 is constituted by a thyristor or a triac, for example. The power controller 4 is connected to the power supply 5 through the terminals 43*a*, 43*b*. The power controller 4 is connected to the oven 3 through the terminals 43*c* to 43*e*.

The first control device 41 and the second control device 42 are connected in parallel to the power supply 5 through the terminal 43*a*. The first control device 41 is connected to a terminal 31*a* provided at one end of the first heater device 31 through the terminal 43*e*. The terminal 43*c* is connected to a terminal 31*b* provided at the other end of the first heater device 31 and a terminal 32*a* provided at one end of the second heater device 32. Further, the terminal 43*d* is connected to a terminal 32*b* provided at the other end of the second heater device 32. In this embodiment, the terminal 43*c* is an example of a first terminal according to the present invention, and the terminal 43*d* is an example of a second terminal according to the present invention.

The terminal 43*d* is connected to either one of the second control device 42 and the terminal 43*b* in accordance with the setting of the gas chromatograph 1. Specifically, the connection destination of the terminal 43*d* is set in accordance with the voltage of the power supply 5. FIG. 1 shows the terminal 43*d* being connected to the second control device 42. The terminal 43*b* is connected to either one of the terminal 43*c* and the terminal 43*d* in accordance with the setting of the gas chromatograph 1. Specifically, the connection destination of the terminal 43*b* is set in accordance with the voltage of the power supply 5. FIG. 1 shows the terminal 43*b* being connected to the terminal 43*c*. With such a configuration, the power controller 4 can change between two connection modes in accordance with the voltage of the power supply 5.

(2) Connection Modes of Power Controller 4

Figure 2:
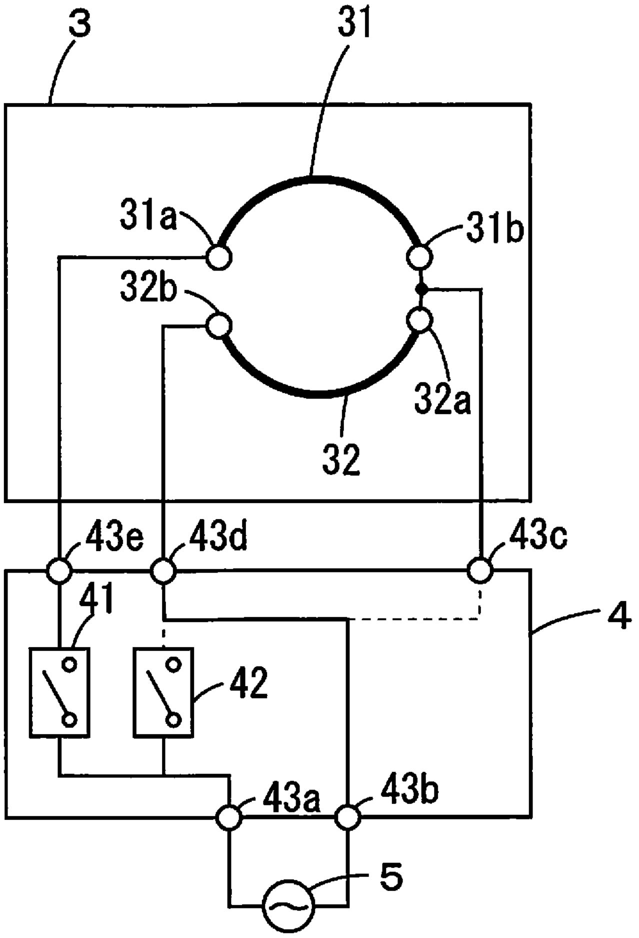
FIG. 2 is a diagram showing an oven and a power controller in a first connection mode in which the voltage of a power supply is 200 V.
Figure 3:
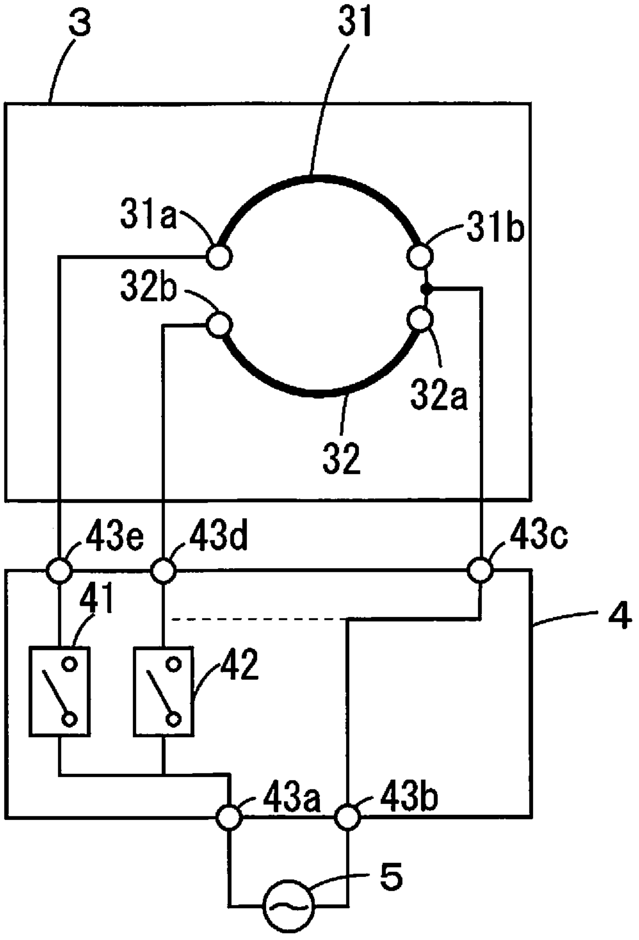
FIG. 3 is a diagram showing the oven and the power controller in a second connection mode in which the voltage of the power supply is 100 V.

Next, the two connection modes of the power controller 4 will be described. FIG. 2 shows a first connection mode. In the first connection mode, the first heater device 31 and the second heater device 32 are connected in series in the oven 3. In the present embodiment, the first connection mode is utilized when the voltage of the power supply 5 is 200 V. FIG. 3 shows a second connection mode. In the second connection mode, the first heater device 31 and the second heater device 32 are connected in parallel in the oven 3. In the present embodiment, the second connection mode is used when the voltage of the power supply 5 is 100 V. In this embodiment, 200 V is an example of a first voltage according to the present invention, and 100 V is an example of a second voltage according to the present invention.

(2-1) First Connection Mode (Power Supply at 200 V: Heater Devices Connected in Series)

As shown in FIG. 2, in the first connection mode, the terminal 43*d* is connected to the terminal 43*b*. In the first connection mode, since the terminal 43*d* is not connected to the second control device 42, the second control device 42 is not used. Further, in the first connection mode, the terminal 43*c* and the power supply 5 are not connected to each other. Thus, the first heater device 31 and the second heater device 32 are connected in series between the terminals 43*a*, 43*b*. Power supplied from the power supply 5 to the first heater device 31 and the second heater device 32 is turned ON or OFF by the first control device 41.

The temperature of the oven 3 is adjusted by the control of the CPU 21. The CPU 21 controls the first control device 41 based on a target temperature of the oven 3 that is set as an analysis condition to control the power supplied from the power supply 5. The CPU 21 performs control in order to achieve a target temperature while monitoring the temperature information detected by the temperature sensor 33 (not shown in FIG. 2). A control command provided by the CPU 21 to the first control device 41 is executed via the PLD 22. The PLD 22 restricts the control for the first control device 41 with use of hardware.

Figure 4:
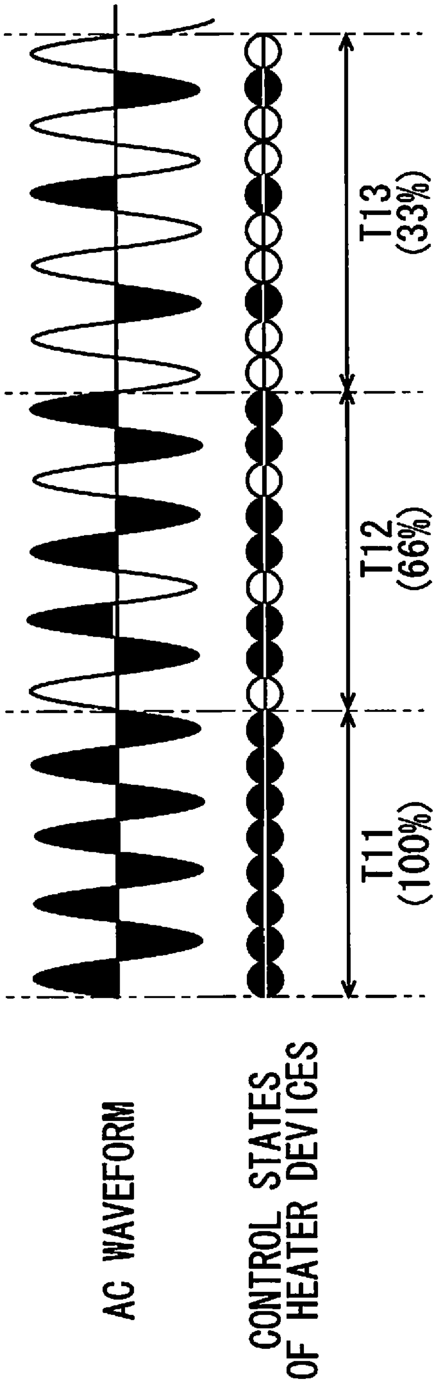
FIG. 4 is a diagram showing one example of a control method performed in the first connection mode in which the voltage of the power supply is 200 V.

FIG. 4 is a diagram showing one example of a control method performed in the first connection mode in which the voltage of the power supply is 200 V. The upper part of FIG. 4 shows the AC waveform of a current supplied from the power supply 5 with the abscissa representing the time and the ordinate representing a current value. The lower part of FIG. 4 shows the timing for supplying power to the first heater device 31 and the second heater device 32 with the time axis aligned with that of the AC waveform in the upper part of the diagram. In the present embodiment, the CPU 21 controls the first control device 41 on the basis of half-waves of the AC waveform.

In FIG. 4, in the time zones in which the AC waveform is blacked out, the first control device 41 is turned ON, and a current is supplied to the oven 3. In regard to the circles shown in the lower part of FIG. 4, the upper semicircles schematically represent the first heater device 31, and the lower semicircles schematically represent the second heater device 32. In the time zones in which the upper semicircles are blacked out, power is supplied to the first heater device 31. In the time zones in which the lower semicircles are blacked out, power is supplied to the second heater device 32. Since the first heater device 31 and the second heater device 32 are connected in series in the first connection mode, control is performed such that power is supplied to both of the heater devices 31, 32 or power is supplied to none of the heater devices 31, 32.

In FIG. 4, in a period T11, the oven 3 is heated at an energy output level of 100% (maximum energy output level). Therefore, in the period T11, power is supplied to the first heater device 31 and the second heater device 32 at all times. That is, the CPU 21 provides a control instruction such that the first control device 41 is turned ON at all times in the period T11. In FIG. 4, in a period T12, the oven 3 is heated at an energy output level of 66%. Therefore, in the period T12, power is supplied to the first heater device 31 and the second heater device 32 at a rate of twice every three times on the basis of half-waves. That is, the CPU 21 provides a control instruction such that the first control device 41 is turned ON at a rate of twice every three times on the basis of half-waves in the period T12. In FIG. 4, in a period T13, the oven 3 is heated at an energy output level of 33%. Therefore, in the period T13, power is supplied to the first heater device 31 and the second heater device 32 at a rate of once every three times on the basis of half-waves. That is, the CPU 21 provides a control instruction such that the first control device 41 is turned ON at the rate of once every three times on the basis of half-waves in the period T13.

In this manner, in the first connection mode, the CPU 21 controls heating of the oven 3 at any duty ratio by controlling the first control device 41. The CPU 21 determines a duty ratio for heating of the oven 3 based on a target temperature provided as an analysis condition and the temperature information acquired from the temperature sensor 33.

(2-2) Second Connection Mode (Power Supply at 100 V: Heater Devices Connected in Parallel)

As shown in FIG. 3, in the second connection mode, the terminal 43*d* is connected to the second control device 42. In the second connection mode, both of the first control device 41 and the second control device 42 are used to control the output of the oven 3. Further, in the second connection mode, the terminal 43*b* is connected to the terminal 43*c*. Thus, the terminals 31*b*, 32*a* are connected to the power supply 5 through the terminal 43*c*. Thus, the first heater device 31 and the second heater device 32 are connected in parallel between the terminals 43*a*, 43*b*. Power supplied from the power supply 5 to the first heater device 31 is turned ON or OFF by the first control device 41, and power supplied from the power supply 5 to the second heater device 32 is turned ON or OFF by the second control device 42.

The CPU 21 controls the first control device 41 and the second control device 42 based on a target temperature of the oven 3 that is set as an analysis condition to control the power supplied from the power supply 5. The CPU 21 performs control in order to achieve a target temperature while monitoring the temperature information detected by the temperature sensor 33 (not shown in FIG. 3). A control command provided by the CPU 21 to the first control device 41 and the second control device 42 is executed through the PLD 22.

Figure 5:
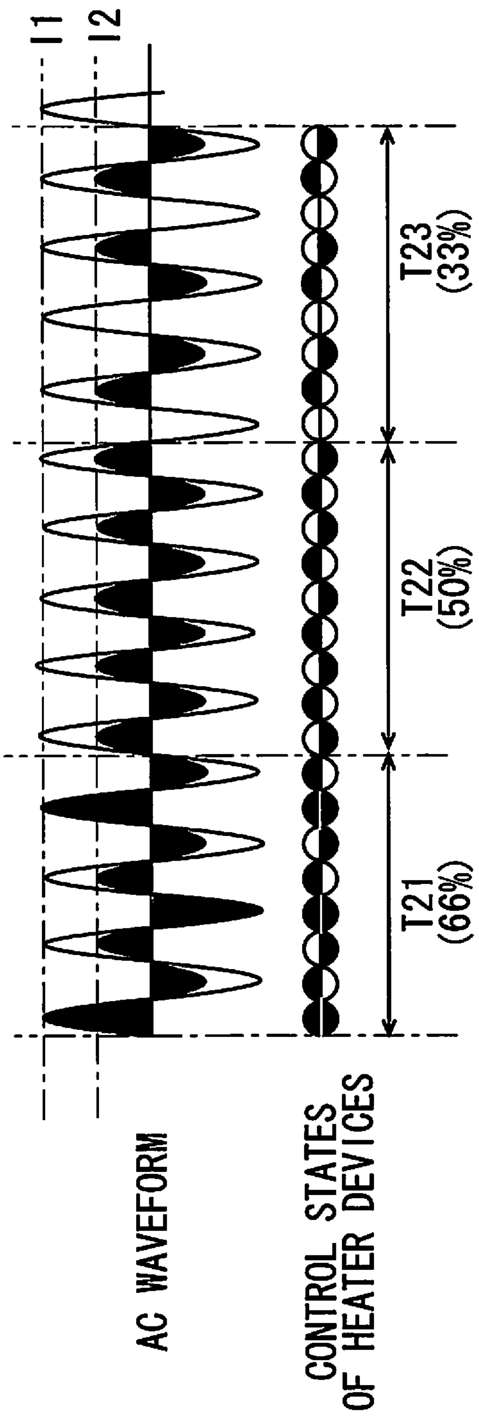
FIG. 5 is a diagram showing one example of a control method performed in the second connection mode in which the voltage of the power supply is 100 V.

FIG. 5 is a diagram showing one example of a control method performed in the second connection mode in which the voltage of the power supply is 100 V. Similarly to the upper part of FIG. 4, the upper part of FIG. 5 shows the AC waveform of a current supplied from the power supply 5 with the abscissa representing the time and the ordinate representing a current value. Similarly to the lower part of FIG. 4, the lower part of FIG. 5 shows the timing for supplying power to the first heater device 31 and the second heater device 32 with the time axis aligned with that of the AC waveform in the upper part of the diagram. In this manner, in the present embodiment, the CPU 21 controls the first control device 41 and the second control device 42 on the basis of half-waves of the AC waveform.

In FIG. 5, in the time zones in which the AC waveform is blacked out, the first control device 41 and/or the second control device 42 is turned ON, and a current is supplied to the oven 3. In regard to the AC waveform shown in FIG. 5, the maximum value of the current value takes two values which are I1 and I2. The maximum value is I1 when power is supplied to both of the first heater device 31 and the second heater device 32. The maximum value is I2 when power is supplied to either one of the first heater device 31 and the second heater device 32. Since the first heater device 31 and the second heater device 32 are connected in parallel in the second connection mode, power may be supplied to both of the heater devices 31, 32, power may be supplied to either one of the heater devices 31, 32, or power may be supplied to none of the heater devices 31, 32. In a case in which power is supplied to both of the heater devices 31, 32, the maximum value of the current is I1. In a case in which power is supplied to either one of the heater devices 31, 32, the maximum value of the current is I2.

In FIG. 5, in a period T21, the oven 3 is heated at an energy output level of 66%. Therefore, in the period T21, power is supplied to both of the first heater device 31 and the second heater device 32 at a rate of once every three times on the basis of half-waves. In the period T21, power is supplied to either one of the first heater device 31 and the second heater device 32 at a rate of twice every three times on the basis of half-waves. That is, the CPU 21 provides a control instruction such that both of the first control device 41 and the second control device 42 are turned ON at the rate of once every three times on the basis of half-waves in the period T21. The CPU 21 provides a control instruction such that either one of the first control device 41 and the second control device 42 is turned ON at the rate of twice every three times on the basis of half-waves in the period T21.

In FIG. 5, in a period T22, the oven 3 is heated at an energy output level of %. Therefore, in the period T22, power is supplied to either one of the first heater device 31 and the second heater device 32 at all times. That is, the CPU 21 provides a control instruction such that either one of the first control device 41 and the second control device 42 is turned ON at all times in the period T22.

In FIG. 5, in a period T23, the oven 3 is heated at an energy output level of 33%. Therefore, in the period T23, power is supplied to none of the first heater device 31 and the second heater device 32 at a rate of once every three times on the basis of half-waves. In the period T23, power is supplied to either one of the first heater device 31 and the second heater device 32 at a rate of twice every three times on the basis of half-waves. That is, the CPU 21 provides a control instruction such that both of the first control device 41 and the second control device 42 are turned OFF at the rate of once every three times on the basis of half-waves in the period T23. The CPU 21 provides a control instruction such that either one of the first control device 41 and the second control device 42 is turned ON at the rate of twice every three times on the basis of half-waves in the period T23.

Figure 6:
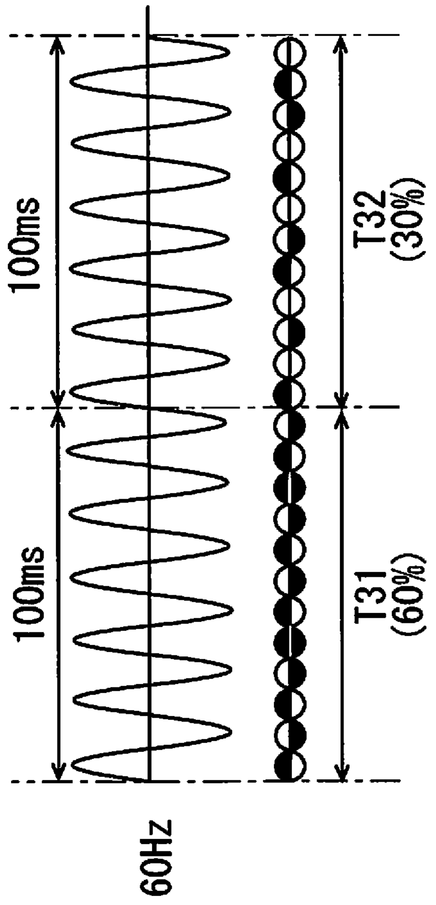
FIG. 6 is a diagram showing another example of a control method performed in the second connection mode in which the voltage of the power supply is 100 V.

(2-3) Control Method Performed in Order to Achieve Target Output of Oven in Second Connection Mode FIGS. 6 and 7 are diagrams showing one example of another control method performed in the second connection mode corresponding to the power supply the voltage of which is 100 V. Also in FIG. 6, the first heater device 31 and the second heater device 32 are controlled on the basis of half-waves of the AC waveform, similarly to FIG. 4 and the like. In FIG. 6, in a period T31, the oven 3 is heated at an energy output level of 60%. Therefore, in the period T31, power is supplied to both of the first heater device 31 and the second heater device 32 at a rate of once every five times on the basis of half-waves. In the period T31, power is supplied to either one of the first heater device 31 and the second heater device 32 at a rate of four times every five times on the basis of half-waves.

In FIG. 6, in a period T32, the oven 3 is heated at an energy output level of %. Therefore, in the period T32, power is supplied to none of the first heater device 31 and the second heater device 32 at a rate of twice every five times on the basis of half-waves. In the period T32, power is supplied to either one of the first heater device 31 and the second heater device 32 at a rate of three times every five times on the basis of half-waves.

Further, in either one of the periods T31, T32, when being supplied to either one of the first heater device 31 and the second heater device 32, power is supplied to the first heater device 31 and the second heater device 32 alternately. This prevents non-uniformity of temperature in the oven 3.

In this manner, the CPU 21 controls heating of the oven 3 at any duty ratio by individually controlling the first control device 41 and the second control device 42. The CPU 21 determines a duty ratio for heating of the oven 3 based on a target temperature provided as an analysis condition and the temperature information acquired from the temperature sensor 33.

FIG. 7 is a diagram showing the control method performed in order to achieve the target output of the oven 3 in the second connection mode shown in FIG. 6. In the diagram, the numerals 1 to 24 are serial numbers representing points in time on the basis of half-waves. In the row for "integration," integrated values of the target output of the oven 3 are shown. Because the target output is 60% in the period T31, a value of 60 is added per half-wave. Because the target output is 30% in the period T32, a value of 30 is added per half-wave. In the row for "output," "upper" means that power is supplied to the first heater device 31, "lower" means that power is supplied to the second heater device 32, and "both" means that power is supplied to both of the heater devices 31, 32. "None" means that no power is supplied to the heater devices 31, 32. When power is supplied to either one of the heater devices 31, 32, the output is 50. Further, when power is supplied to both of the heater devices 31, 32, the output is 100. In the row for "surplus," differences from the target output are shown.

At a point 1 in time, 60 is added as the target output, 50 is subtracted because power is supplied to the first heater device 31. Thus, the "surplus" is 10. At a point 2 in time, 60 is added to the "surplus" of 10 for the point 1 in time, 50 is subtracted because power is supplied to the second heater device 32. Thus, the "surplus" is 20. At a point 5 in time, 60 is added to the "surplus" of 40 for a point 4 in time, 100 is subtracted because power is supplied to the first heater device 31 and the second heater device 32. Thus, the "surplus" is 0. That is, in a case in which a value for "integration" does not exceed 50, no power is supplied to the heater devices 31, 32. In a case in which a value for "integration" exceeds 50 and does not exceed 100, power is supplied to either one of the heater devices 31, 32. In a case in which a value for "integration" exceeds 100, power is supplied to both of the heater devices 31, 32.

Similarly, in the period T32, at a point 13 in time, the target output of 30 is added to the "surplus" of 20 for a point 12 in time, 50 is subtracted because power is supplied to the first heater device 31. Thus, the "surplus" is 0. At a point T14 in time, the target output of 30 is added to the "surplus" of 0 for the point 13 in time. However, because the value for "integration" is 30 and smaller than 50, no power is supplied to the first heater device 31 and the second heater device 32, and the "surplus" is 30.

(3) Effects of Embodiments

As described above, in the gas chromatograph 1 of the present embodiment, the oven 3 can be used in either one of the first connection mode and the second connection mode in accordance with the voltage of the power supply 5. For example, when the voltage of the power supply 5 is 200 V, it is possible to use the oven 3 as a high-output apparatus by setting the gas chromatograph 1 in the first connection mode. That is, in the first connection mode, the first heater device 31 and the second heater device 32 can be used as devices having sufficiently small resistance values such that the oven 3 can output high energy.

When the resistance values of the first heater device 31 and the second heater device 32 are small, in a case in which the voltage of the power supply 5 is 100 V and the gas chromatograph is used in the second connection mode, for example, a high current flows due to the configuration of the circuit. In a case in which a high current flows through the power controller 4, there is a problem that special specifications are required for electric equipment such as cables. However, with the gas chromatograph 1 of the present embodiment, it is possible to make the duty ratio of power supplied to the first heater device 31 and the second heater device 32 be smaller than 100 by controlling ON/OFF of the first control device 41 and the second control device 42 in the second connection mode. It is also possible to suppress an increase in current value in the second connection mode by adjusting the duty ratio of supplied power. Thus, it is possible to provide the gas chromatograph 1 that is compatible with a universal power supply and is connectable to the power supply 5 that supplies power at different voltages such as 100 V and 200 V. In the gas chromatograph 1, the oven 3 functions as a high-output apparatus in an environment of high-voltage such as 200 V, and the oven 3 functions as a standard-output apparatus in an environment of standard-voltage such as 100 V.

Conventionally, attempts have been made to enable two heater devices to be used in two connection modes for series connection and parallel connection such that an oven can output the same energy with power supplied at 100 V or 200 V. Suppose that there are two systems in which the voltages of the power supplies are respectively V and 2V, and the resistances of two heater devices are both R, for example. In a case in which the voltage of the power supply is 2V, the heater devices are connected in series. Further, in a case in which the voltage of the power supply is V, the heater devices are connected in parallel. In this case, power is 2V^2/R in a case in which the heater devices are connected either in series or in parallel. However, although a current is V/R in case of series connection, a current is 2V/R, which is twice as high as the current in case of series connection, in case of parallel connection. Therefore, in order to prevent a current from being high when the voltage of the power supply is 100 V, the value of R cannot be made very small. Thus, there is a problem that energy output that is required when the voltage of power supply is 200 V cannot be obtained. However, the energy output by an oven of a gas chromatograph is one of the indicators of oven performance, and there are user needs to use an oven at high output when the voltage of the power supply is 200 V. Thus, with the gas chromatograph 1 of the present embodiment, energy output is suppressed when the voltage of the power supply is 100 V by adjustment of a duty ratio of power to be supplied. Therefore, it is possible to prevent the value of a current flowing when the voltage of the power supply is 100 V from being excessively high while making the output of the oven 3 high when the voltage of the power supply is 200 V by reducing the resistance values of the heater devices.

The control of supply of power to the first heater device 31 and the second heater device 32 for achievement of target output as described above is realized by the ON/OFF control of the first control device 41 and the second control device 42 by the CPU 21. Further, in the present embodiment, a control command is provided by the CPU 21 to the first control device 41 and the second control device 42 through the PLD 22. Thus, the ON/OFF control of the first control device 41 and the second control device 42 can be restricted by hardware.

For example, in a case in which restriction is imposed by the PLD 22 such that only one of the first control device 41 and the second control device 42 is turned ON, the output of the oven 3 can be restricted so as not to exceed 50%. In regard to the above-mentioned example of the second connection mode with reference to FIG. 5, restriction is imposed by the PLD 22 such that, after both of the heater devices 31, 32 are turned ON, both of the heater devices 31, 32 are not turned ON at the same time subsequently twice on basis of half-waves. This can restrict the maximum energy output level to 66% when the voltage of the power supply is 100 V. Further, in the example of FIG. 5, a high current instantaneously flows when the energy output level is 66%. However, it is also possible to suppress the maximum value of a current flowing instantaneously by restricting the duty ratio to 50% with use of the PLD 22. That is, with the PLD 22, it is possible to restrict the duty ratio of power supplied to the first control device 41 and the second control device 42 to a predetermined value. Even in a case in which the CPU 21 provides an incorrect command for some reason, it is possible to restrict the output of the oven 3 with hardware control.

(4) Modified Example

Figure 8:
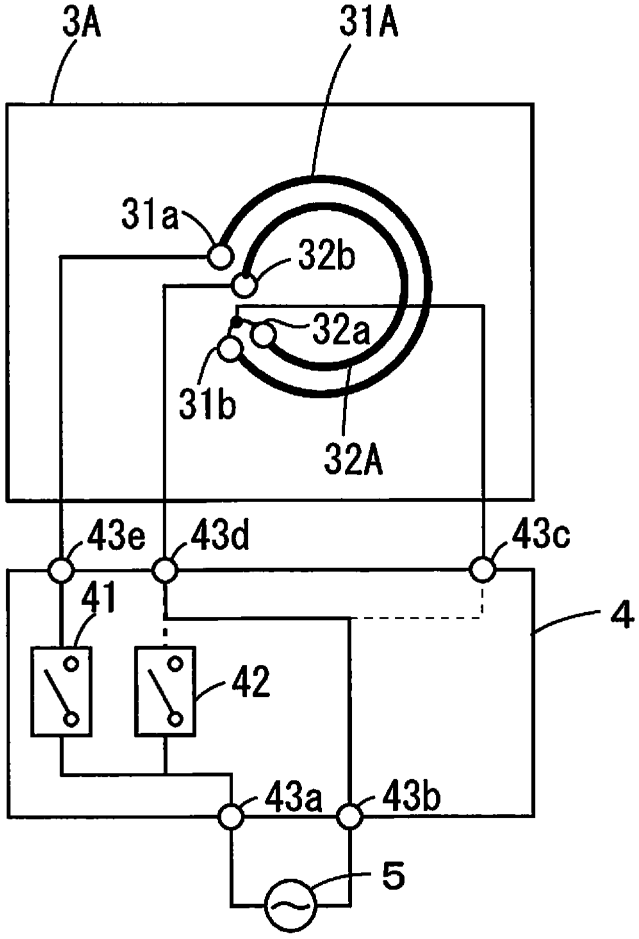
FIG. 8 is a diagram showing a modified example showing an oven and a power controller in the first connection mode in which the voltage of the power supply is 200 V.
Figure 9:
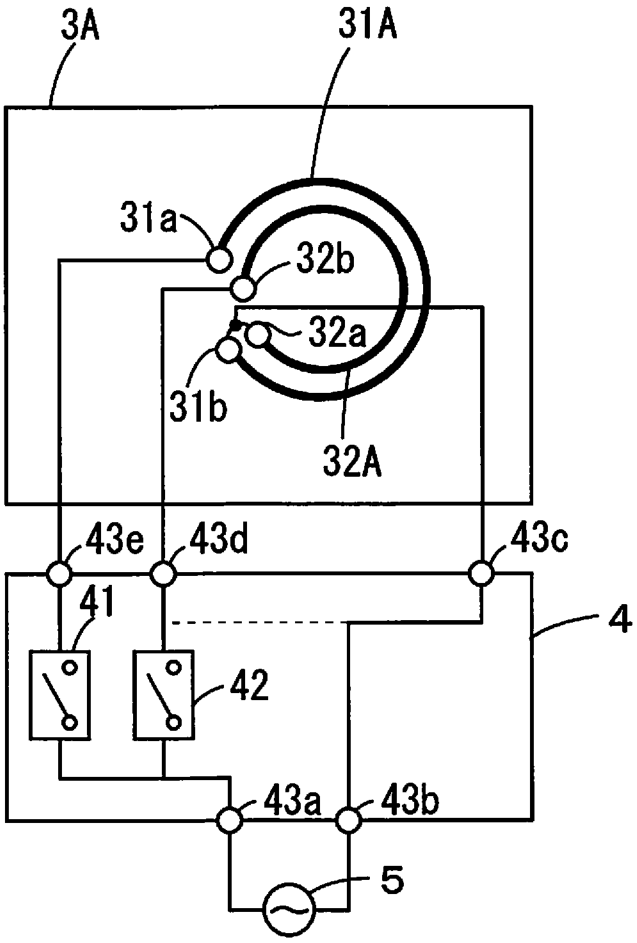
FIG. 9 is a diagram showing the modified example of the oven and the power controller in the second connection mode in which the voltage of the power supply is 100 V.

Next, the modified example of the gas chromatograph 1 of the present embodiment will be described. FIGS. 8 and 9 are diagrams showing an oven 3A and a power controller 4 included in a gas chromatograph 1 according to a modified example. The configuration of the power controller 4 is similar to that in the above-mentioned embodiment. Each of a first heater device 31A and a second heater device 32A included in the oven 3A has a substantially circular shape. Further, the first heater device 31A and the second heater device 32A are arranged so that the centers of the circles coincide with each other. The heater devices as a whole make a double circular shape. With such a configuration, it is possible to suppress non-uniformity of temperature in the oven 3. While non-uniformity of temperature is suppressed by alternate supply of power to the first heater device 31 and the second heater device 32 in the above-mentioned embodiment, it is possible to maintain uniformity of temperature in the oven 3 without performing such control in this modified example.

While the resistance values of the first heater device 31 and the second heater device 32 are equal to each other in the above-mentioned embodiment by way of example, this is merely one example. The resistance values of the first heater device 31 and the second heater device 32 may be different from each other. In the above-mentioned embodiment, the gas chromatograph 1 is used in the first connection mode when the voltage of the power supply is 200 V, and the gas chromatograph 1 is used in the second connection mode when the voltage of the power supply is 100 V, by way of example. However, this is merely one example. There is an advantage to use the gas chromatograph 1 when the voltage of the power supply connected in the second connection mode is lower than the voltage of the power supply connected in the first connection mode. For example, the gas chromatograph 1 may be used in the first connection mode when the voltage of the power supply is 230 V, and the gas chromatograph 1 may be used in the second connection mode when the voltage of the power supply is 115 V.

While the gas chromatograph 1 including the controller 2, the oven 3 and the power controller 4 of the present embodiment is described by way of example in the above-mentioned embodiment, the present embodiment can be also applied to a gas chromatograph-mass spectrometer.

(5) Aspects

It will be appreciated by those skilled in the art that the exemplary embodiments described above are illustrative of the following aspects.

(Item 1) A gas chromatograph according to one aspect includes an oven that has a first heater device and a second heater device and houses a column, a power controller that controls power to be supplied from a power supply to the oven, and a controller that controls an operation of the gas chromatograph, wherein the first heater device and the second heater device are connected in series when a voltage of the power supply is a first voltage, or are connected in parallel when the voltage of the power supply is a second voltage that is lower than the first voltage, the power controller includes a first control device that controls ON/OFF of supply of power to the series-connected first heater device and second heater device or controls ON/OFF of supply of power to the parallel-connected first heater device, and a second control device that controls ON/OFF of supply of power to the parallel-connected second heater device, and the controller adjusts a duty ratio of supply of power to the parallel-connected first heater device and second heater device by controlling the first control device and the second control device when the voltage of the power supply is the second voltage.

A current value can be suppressed when the voltage of the power supply is the second voltage. Thus, the resistance values of the heater devices can be reduced, and the oven can be configured to output high energy when the voltage of the power supply is the first voltage. It is possible to provide the gas chromatograph including the oven that can output high energy while being usable with different voltages of the power supply.

(Item 2) The gas chromatograph according to item 1, wherein the controller may adjust a duty ratio of supply of power to the series-connected first heater device and second heater device by controlling the first control device when the voltage of the power supply is the first voltage.

The output of the oven obtained when the voltage of the power supply is the first voltage can be adjusted.

(Item 3) The gas chromatograph according to item 1, wherein resistance values of the first heater device and the second heater device may be equal to each other, and the first voltage may be twice as high as the second voltage.

It is possible to provide the gas chromatograph compatible with a universal power supply.

(Item 4) The gas chromatograph according to item 1, wherein the controller may control ON/OFF of supply of power to the first heater device and the second heater device on a basis of half-waves of a current supplied from the power supply.

The output of the oven can be adjusted with a desired duty ratio.

(Item 5) The gas chromatograph according to item 1, wherein the controller may turn ON supply of power to the first heater device and the second heater device alternately.

Non-uniformity of temperature in the oven can be suppressed.

(Item 6) The gas chromatograph according to item 1, wherein the controller may include a hardware logic device that restricts a duty ratio of supply of power to the first heater device and the second heater device to a predetermined value.

It is possible to restrict energy output by the oven by restricting the duty ratio of the oven with use of hardware.

(Item 7) The gas chromatograph according to item 1, wherein one end of the first control device and one end of the second control device may be connected in parallel to one end of the power supply, one end of the first heater device may be connected to another end of the first control device, another end of the first heater device may be connected to one end of the second heater device and a first terminal, and another end of the second heater device may be connected to a second terminal, the gas chromatograph may be switched such that, when the voltage of the power supply is the first voltage, the second terminal is connected to another end of the power supply, and the gas chromatograph may be switched such that, when the voltage of the power supply is the second voltage, the first terminal is connected to the another end of the power supply and the second terminal is connected to another end of the second control device.

The gas chromatograph is compatible with the first voltage and the second voltage by a change of connection among terminals.

(Item 8) The gas chromatograph according to item 1, wherein each of the first heater device and the second heater device may have a substantially semicircular shape, and the first heater device and the second heater device may constitute a substantially circular heater device when being connected to each other.

The combination of the first heater device and the second heater device is utilized as a circular heater device for heating the inside of the oven.

(Item 9) The gas chromatograph according to item 1, wherein each of the first heater device and the second heater device may have a substantially circular shape, and the first heater device and the second heater device may constitute a double-circular heater device when being connected to each other.

Also in a case in which power is supplied to either one of the first heater device and the second heater device, non-uniformity of temperature in the oven can be suppressed.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

We claim:

1. A gas chromatograph comprising:

an oven that has a first heater device and a second heater device and houses a column;

a power controller that controls power to be supplied from a power supply to the oven; and a controller that controls an operation of the gas chromatograph, wherein the first heater device and the second heater device are connected in series when a voltage of the power supply is a first voltage, or are connected in parallel when the voltage of the power supply is a second voltage that is lower than the first voltage, the power controller includes:

a first control device configured to control ON/OFF of supply of power to the series-connected first heater device and second heater device in a first state, and to control ON/OFF of supply of power to the parallel-connected first heater device in a second state, a second control device configured to control ON/OFF of supply of power to the parallel-connected second heater device, and wherein the controller is configured to adjust a duty ratio of supply of power to the parallel-connected first heater device and second heater device by controlling the first control device and the second control device when the voltage of the power supply is the second voltage such that a peak current flowing through the power controller is suppressed to a predetermined value or less to reduce temperature non-uniformity, wherein the first and second control devices are controlled independent of each other when the voltage of the power supply is the second voltage.

2. The gas chromatograph according to claim 1, wherein the controller adjusts a duty ratio of supply of power to the series-connected first heater device and second heater device by controlling the first control device when the voltage of the power supply is the first voltage.

3. The gas chromatograph according to claim 1, wherein resistance values of the first heater device and the second heater device are equal to each other, and the first voltage is twice as high as the second voltage.

4. The gas chromatograph according to claim 1, wherein the controller adjusts a duty ratio of supply of power to the first heater device and the second heater device and controls ON/OFF of supply of power to the first heater device and the second heater device on a basis of half-waves of a current supplied from the power supply.

5. The gas chromatograph according to claim 1, wherein the controller turns ON supply of power to the first heater device and the second heater device alternately.

6. The gas chromatograph according to claim 1, wherein the controller includes a hardware logic device that restricts a duty ratio of supply of power to the first heater device and the second heater device to a predetermined value.

7. The gas chromatograph according to claim 1, wherein one end of the first control device and one end of the second control device are connected in parallel to one end of the power supply, one end of the first heater device is connected to another end of the first control device, another end of the first heater device is connected to one end of the second heater device and a first terminal, and another end of the second heater device is connected to a second terminal, the gas chromatograph is switched such that, when the voltage of the power supply is the first voltage, the second terminal is connected to another end of the power supply, and the gas chromatograph is switched such that, when the voltage of the power supply is the second voltage, the first terminal is connected to the another end of the power supply and the second terminal is connected to another end of the second control device.

8. The gas chromatograph according to claim 1, wherein each of the first heater device and the second heater device has a substantially semicircular shape, and the first heater device and the second heater device constitute a substantially circular heater device when being connected to each other.

9. The gas chromatograph according to claim 1, wherein each of the first heater device and the second heater device has a substantially circular shape, and the first heater device and the second heater device constitute a double-circular heater device when being connected to each other.

10. The gas chromatograph according to claim 1, wherein the duty ratio adjustment limits a current flowing through the power controller to prevent the current from exceeding a predetermined value by independently controlling ON/OFF timing of the first control device and the second control device such that power is selectively supplied to both heater devices, to either one of the heater devices, or to neither of the heater devices.

* * * * *